(12) United States Patent
Gao

(10) Patent No.: US 8,341,515 B2
(45) Date of Patent: Dec. 25, 2012

(54) METHOD FOR VALIDATING UNIQUE PARTICLE ATTRIBUTION CONSTRAINTS IN EXTENSIBLE MARKUP LANGUAGE SCHEMAS

(75) Inventor: Shudi Gao, Richmond Hil (CA)

(73) Assignee: International Business Machines Corporation, Armonk, NY (US)

( * ) Notice: Subject to any disclaimer, the term of this patent is extended or adjusted under 35 U.S.C. 154(b) by 1227 days.

(21) Appl. No.: 11/848,577

(22) Filed: Aug. 31, 2007

(65) Prior Publication Data
US 2009/0063950 A1 Mar. 5, 2009

(51) Int. Cl.
*G06F 17/00* (2006.01)
(52) U.S. Cl. .................................. 715/234; 715/237
(58) Field of Classification Search .................. 715/237, 715/234
See application file for complete search history.

(56) References Cited

U.S. PATENT DOCUMENTS

| | | | |
|---|---|---|---|
| 7,571,196 B2 * | 8/2009 | Purdy et al. ............................ | 1/1 |
| 7,590,644 B2 * | 9/2009 | Matsakis et al. ...................... | 1/1 |
| 7,685,566 B2 * | 3/2010 | Brown et al. .................. | 717/114 |
| 7,788,654 B2 * | 8/2010 | Kostoulas et al. ............. | 717/151 |
| 2005/0166183 A1 * | 7/2005 | Brown et al. .................. | 717/114 |
| 2005/0235009 A1 * | 10/2005 | Purdy et al. .................... | 707/203 |
| 2005/0273772 A1 * | 12/2005 | Matsakis et al. .............. | 717/136 |
| 2008/0028374 A1 * | 1/2008 | Matsa et al. ................... | 717/141 |
| 2008/0046453 A1 * | 2/2008 | Kostoulas et al. ............. | 707/101 |
| 2008/0228810 A1 * | 9/2008 | Matsa et al. ................... | 707/102 |
| 2009/0006943 A1 * | 1/2009 | Matheson et al. ............. | 715/234 |

OTHER PUBLICATIONS

"XSConstraints.java" Xerces2 source code, archived Jun. 2006, Apache Software Foundation, version 2_8_0, pp. 1-31, retrieved from http: //web.archive.org/web/20060617230231/www.apache.org/dist/xml/xerces-j/source/Xerces-J-src.2.8.0.zip.*
"XSDFACM.java" Xerces2 source code, archived Jun. 2006, Apache Software Foundation, version 2_8_0, pp. 1-31, retrieved from http: //web.archive.org/web/20060617230231/www.apache.org/dist/xml/xerces-j/source/Xerces-J-src.2.8.0.zip.*
Richard Chang and Thomas A. Anastasio, "CMSC 202 Lecture Notes: Recursion", 1998, pp. 1-14, retrieved from http://replay.waybackmachine.org/20020514062710/http://www.cs.umbc.edu/~chang/cs202.f98/readings/recursion.html.*
Richard Chang "UMBC CMSC202, Computer Science II, Fall 1998, Sections 0101, 0102, 0103, 0104: Course Description", 1998, pp. 1-2, retrieved from http://replay.waybackmachine.org/20020906170316/http://www.cs.umbc.edu/~chang/cs202.f98/description.shtml.*
Supporting UPA and restriction on an extension of XML Schema, [online], [retrieved Aug. 30, 2007]; retrieved from the Internet http://www.idealliance.org/papers/extreme03/html/2003/Fuchs01/EML2003Fuchs01.html.
Using Finite State Automata to Implement W3C XML Schema Content Model Validation and Restriction Checking, [online]; [retrieved Aug. 30, 2007]; retrieved from the Internet http://www.idealliance.org/papers/dx_xmle03/papers/020205/020205.html.

(Continued)

*Primary Examiner* — Thu Huynh
(74) *Attorney, Agent, or Firm* — Cantor Colburn LLP; Libby Toub

(57) ABSTRACT

A method for validating unique particle attribution (UPA) in extensible markup language (XML) schemas includes receiving an input argument including a particle of an XML schema, verifying particle occurrence information of the XML schema, verifying particle sequence model group information of the XML schema, verifying particle choice model group information of the XML schema, verifying particle all model group information of the XML schema, and recursively calling additional instances of the method for validating UPA such that all particles recursively defined in the particle of the input argument are subject to verification of UPA constraints.

5 Claims, 1 Drawing Sheet

OTHER PUBLICATIONS

XML Schema Part 1: Structures Second Edition, [online]; [retrieved on Aug. 30, 2007]; retrieved from the Internet http://www.w3.org/TR/2004/REC-xmlschema-1-20041028.

XML Schema 1.1 Part 1: Structures, [online]; [retrieved on Aug. 30, 2007]; retrieved from the internet http://www.w3org/TR/2005/WD-xmlschema11-1-20050224.

Applications of Brzozowski derivatives to XML Schema processing, [online]; [retrieved on Aug. 30, 2007]; retrieved form the Internet http://www.mulberrytech.com/Extreme/Proceedings/html/2005/SperbergMcQueen01/EML2005SperbergMcQueen01.html.

One-Unambiguity of Regular Expressions with Numeric Occurrence Indicators, [online]; [retrieved on Aug. 30, 2007]; retrieved from the Internet http://www.cs.uku.fi/tutkimus/publications/reports/A-2006-2.pdf.

\* cited by examiner

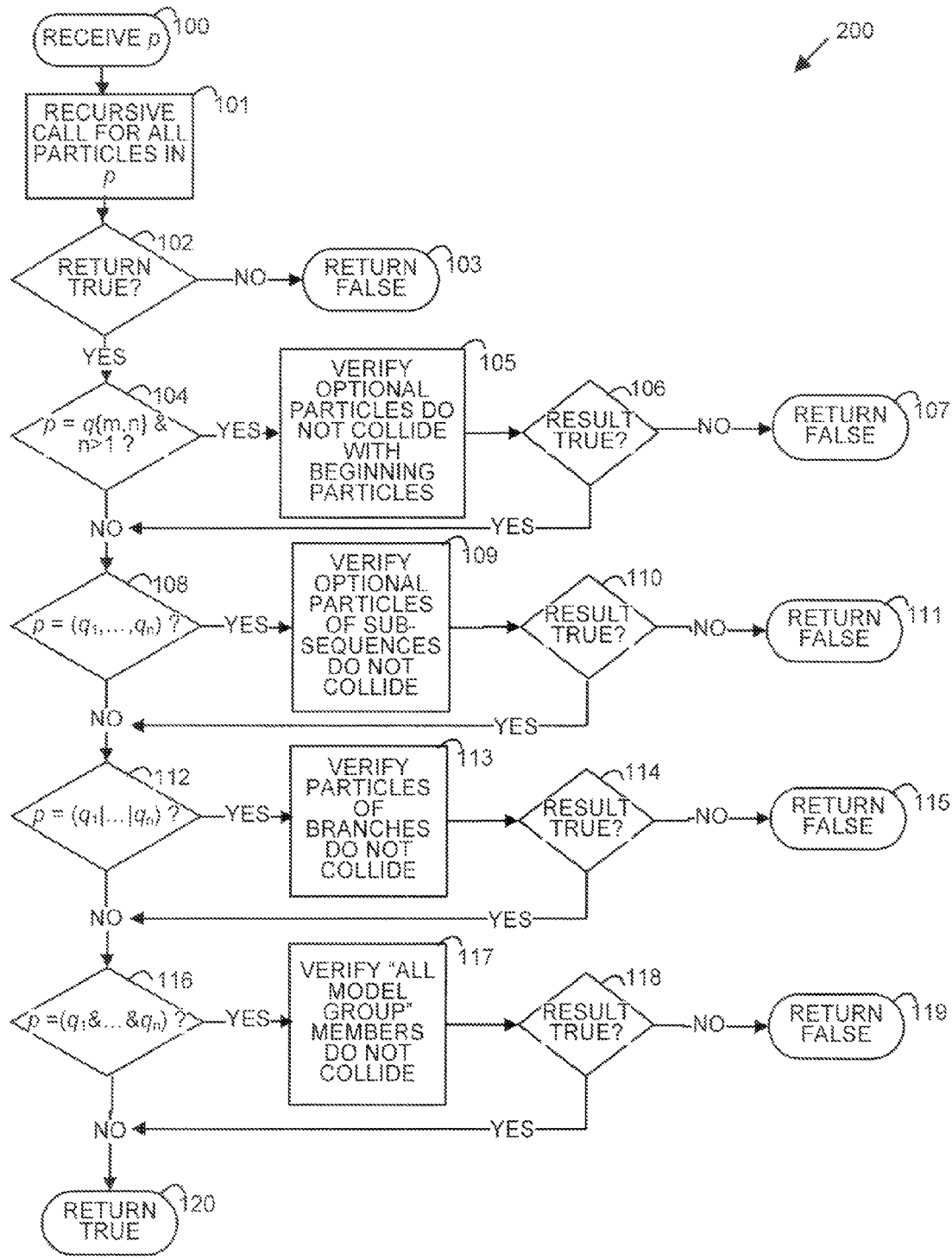

METHOD FOR VALIDATING UNIQUE PARTICLE ATTRIBUTION CONSTRAINTS IN EXTENSIBLE MARKUP LANGUAGE SCHEMAS

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND

1. Technical Field

This invention generally relates to unique particle attribution (UPA). Specifically, this invention relates to validating UPA constraints in extensible markup language (XML) schemas.

2. Description of Background

XML is a general-purpose markup language classified as an extensible language because it allows its users to define their own tags. One function of XML is to facilitate the sharing of data across different information systems, particularly via the Internet. An XML schema is a description of a type of XML document, typically expressed in terms of constraints on the structure and content of documents of that type, above and beyond the basic syntax constraints imposed by XML itself. An XML schema provides a view of the document type at a relatively high level of abstraction.

There are languages developed specifically to express XML schemas. The Document Type Definition (DTD) language, which is native to the XML specification, is a schema language that is of relatively limited capability, but that also has other uses in XML aside from the expression of schemas. Two other very popular, more expressive XML schema languages are W3C XML Schema Definition Language and RELAX NG. However, for the purposes of this description, the term "schema" refers to an XML Schema instance of the W3C XML Schema Definition Language.

The process of checking to see if an XML document conforms to a schema is called validation, which is separate from XML's core concept of syntactic well-formedness. All XML documents must be well-formed, but it is not required that a document be valid unless the XML parser is actually validating, in which case the document is also checked for conformance with its associated schema.

Documents are only considered valid if they satisfy the requirements of the schema with which they have been associated. The unique particle attribution (UPA) rule is XML schema's mechanism to prevent schema ambiguity. For a schema content model to be valid with respect to UPA, it must be possible to attribute particles to a sequence of element information items unambiguously without looking ahead.

However, validating UPA constraints is difficult to implement. Conventionally proposed solutions, including expanding numeric exponents of content models into finite state automata, may exhibit exponential and/or erratic behavior, resulting in intractability of these proposed solutions.

SUMMARY

A method for validating unique particle attribution (UPA) constraints in extensible markup language (XML) schemas includes receiving an input argument including one particle of the XML schema, verifying particle occurrence information of the XML schema through validation that optional particles of a latter portion of the repeating term do not collide with particles of a beginning portion of the repeating term and verifying particle sequence model group information of the XML schema through validation that optional particles of a latter portion of a first subsequence of the sequence model group information do not collide with particles of a beginning portion of a second subsequence of the sequence model group information. The method further includes verifying particle choice model group information of the XML schema through validation that particles of a beginning portion of any two different branches of the XML schema do not collide, verifying particle all model group information of the XML schema through validation that particles of beginning portions of all model group members do not collide and that particles of a beginning portion of a first all model group member and optional particles of a latter portion of a second all model group member do not collide, and recursively calling additional instances of the method for validating UPA such that all particles contained in the input argument are subject to verification of UPA constraints.

Additional features and advantages are realized through the techniques of the exemplary embodiments described herein. Other embodiments and aspects of the invention are described in detail herein and are considered a part of the claimed invention. For a better understanding of the invention with advantages and features, refer to the detailed description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 1 illustrates a method of validating unique particle attribution in extensible markup language schemas, according to an exemplary embodiment.

The detailed description explains an exemplary embodiment, together with advantages and features, by way of example with reference to the drawings.

DETAILED DESCRIPTION

According to an exemplary embodiment, a solution has been achieved which significantly increases the tractability of validating unique particle attribution constraints in extensible markup language schemas.

In XML schema, complex content models are constrained by the unique particle attribution (UPA) constraint rule. This rule requires that each element in an instance document correspond unambiguously to exactly one particle in its parent's content model. Any schema that contains a type with a potentially ambiguous content model should be rejected.

The most common causes of ambiguity are wildcard characters and particles that have variable occurrence ranges. However, other causes also exist, which are addressed by an exemplary embodiment of the present invention. Hereinafter notation and syntax of the present invention are described in detail, followed by a detailed description of a method according to an exemplary embodiment of the present invention.

For ease of interpretation, extended regular expression syntax is used herein to denote particles of XML schemas. For example, the following table, denoted Table 1, shows extended regular expression syntax in a W3C schema:

TABLE 1

| | | |
|---|---|---|
| 1. particle | ::= | term occurrence? |
| 2. term | ::= | ELEMENT | WILDCARD | modelGroup |
| 3. modelGroup | ::= | sequence | choice | all |
| 4. sequence | ::= | '(' ( particle (',' particle)*)? ')' |
| 5. choice | ::= | '(' ( particle ('|' particle)*)? ')' |
| 6. all | ::= | '(' ( particle ('&' particle)*)? ')' |
| 7. occurrence | ::= | '{' min ',' max '}' |
| 8. min | ::= | NON_NEG_INT |
| 9. max | ::= | POS_INT | 'U' |

As set forth in Table 1, occurrence information is optional for a particle. Thus, if occurrence information is omitted, a default set of $\{1,1\}$ may be implied. However, if occurrence information is presented as the set $\{m, n\}$, m should be less than or equal to n. Further, NON_NEG_INT denotes non-negative integers, POS_INT denotes positive integers, and 'U' denotes unbounded. For the purposes of this disclosure it is assumed that "unbounded" values are greater than any integer. Additionally, line 2 of Table 1 sets forth term definitions. For example, term$\{min,max\}$ includes a repeating term (e.g., for (a,b)$\{3,5\}$, "(a,b)" is the repeating term). Furthermore, for the purposes of this disclosure it is noted that the "all model group" refers to the model group "all" as set forth in lines three and six of Table 1, the "choice model group" refers to the model group "choice" as set forth in lines three and 5 of Table 1, and the "sequence model group" refers to the model group "sequence" as set forth in lines three and four of Table 1. To better understand the use of extended regular syntax as presented in Table 1, the following example is presented in Expression 1 and Table 2. Expression 1 corresponds to the extended regular syntax formulation of the schema fragment set forth in Table 2:

$$((a, b \{0, 1\})\{3, 3\}|c \{1, U\}) \qquad \text{Expression 1}$$

TABLE 2

| | |
|---|---|
| 1. | <xsd:choice> |
| 2. |   <xsd:sequence minOccurs="3" maxOccurs="3"> |
| 3. |     <xsd:element name="a" minOccurs="1" maxOccurs="1"/> |
| 4. |     <xsd:element name="b" minOccurs="0" maxOccurs="1"/> |
| 5. |   </xsd:sequence> |
| 6. |   <xsd:element name="c" minOccurs="1" maxOccurs="unbounded"/> |
| 7. | </xsd:choice> |

It is noted that the inclusion of the schema fragment of Table 2 is for illustrative purposes only, and should not be construed as limiting. It is further noted that as used herein, a particle is a particle of a schema or portion of a schema and a particle contains information about all particles that may affect UPA of said particle. Therefore, if a single particle of a schema is examined, the single particle will contain necessary information to verify at least a portion of UPA constraints for the schema. Finally, it is necessary to define seven properties of a particle to be used in a method according to an exemplary embodiment of the present invention. The seven properties include the particles contained in a particle, the opacity of a particle, the first set of a particle, the optional trailing particles of a particle, the optional leading particles of a particle, the overlapping of particles, and the collision of particles. Hereinafter, each property will be described in detail.

The particles contained in a particle p, denoted particles(p), include any particle that is recursively defined in p, including p itself. Such may be calculated by an algorithm similar to Algorithm 1 provided below:

Algorithm 1.

```
particles(p) (
    if p=(α_1, ...,α_n), then {p}∪ (∪ⁿ_{i=1} particles(α_i));
    else if p=(α_1 & ... & α_n), then {p}∪ (∪ⁿ_{i=1} particles(α_i));
    else if p=( α_1 | ... | α_n), then {p}∪ (∪ⁿ_{i=1} particles(α_i));
    else if p=α {m,n}, then {p}∪ particles(α );
    else if p is a terminal, {p};
) \\end particles(p)
```

The opacity of a particle, denoted opaque(p), includes a Boolean value of whether or not a particle p is opaque. A particle is opaque if it cannot match an empty string. Otherwise, the particle is transparent. Such may be calculated by an algorithm similar to Algorithm 2 provided below:

Algorithm 2.

```
opaque(p) (
    if p= α {0,n}, (α any particle) then false;
    else if p=(α_1, ... ,α_n) or p=(α_1 & ... & α_n), then ∨ⁿ_{i=1} opaque(α_i);
    else if p=( α_1 | ... | α_n), then ∧ⁿ_{i=1} opaque(α_i);
    else if p=α {m,n}, m>0, then opaque(α );
    else if p is a terminal, then true;
    else if p is the empty sequence, then false
) \\end opaque (p)
```

The first set, denoted first(p), represents all terminals in a particle p that match the first symbol in a string matching p. Such may be calculated by an algorithm similar to Algorithm 3 provided below:

Algorithm 3.

```
first(p)(
    if p=a, a is a terminal, then {a};
    else if p=α {m,n}, then first(α );
    else if p=( α_1 | ... | α_n) or p=(α_1 & ... & α_n), then ∪ⁿ_{i=1} first(α_i);
    else if p=(α_1, ... ,α_n), then
        if opaque(α_1), then first(α_1);
        else first(α_1) ∪ first((α_2, ... ,α_n));
) \\end first(p)
```

The property optional trailing particles of a particle p, denoted otp(p), represents suffixes of p that do not need to be matched when matching p. More clearly, if there exists an arbitrary string $s_i$, otp(p) are those particles that match a non-empty string $s_2$ such that both $s_1$ and $s_1 s_2$ match p. Such may be calculated using an algorithm similar to Algorithm 4 provided below:

Algorithm 4.

```
otp(p)(
    if p = a, a is a terminal, then { };
    if p = ( ), then { };
    if p = (q) then otp(q);
    if p = q{m,n} then
        if m = n then otp(q);
        else {q} ∪ otp(q);
    if p = (q_1,...,q_n) then
        if opaque(q_n) then otp(q_n);
        else otp(q_n) ∪ otp((q_1,...,q_{n-1}));
    if p = (q_1|...|q_n) or p = (q_1&...&q_n) then ∪ⁿ_{i=1}otp(q_i);
);\\end otp(p)
```

The property of optional leading terminals of a particle p, denoted olt(p), represents all terminals that lead strings matching members of olt(p). Such may be calculated using an algorithm similar to Algorithm 5 provided below:

---
Algorithm 5.
---
olt(p)(
 $\bigcup_{q \in otp(p)}$ first(q);
);\\end olt(p)
---

Overlap, denoted overlap(p,q), is a property between terminal symbols of a schema. For example, two terminal symbols p and q overlap if both p and q match the same input symbol. Such may be calculated using an algorithm similar to Algorithm 6 provided below:

---
Algorithm 6.
---
overlap(p,q)(
   if p and q are both element declarations with same name,
      then true;
   if p and q are both wildcards with overlapping namespaces,
      then true;
   if p element declaration and q wildcard and p is allowed by q,
      then true;
   if p wildcard and q element declaration and q is allowed by p,
      then true;
   otherwise false;
);\\end overlap(p,q)
---

Finally, collision is defined as whether or not two sets of terminal symbols collide. For example, two sets of terminal symbols $s_1$ and $s_2$ collide, denoted collide($s_1$, $s_2$), if there exists terminal symbols meeting the criteria of Expression 2, provided below:

$$t_1 \in s_1,\ t_2 \in s_2,\ t_1 != t_2,\ \text{and overlap}(t_1, t_2). \quad \text{Expression 2}$$

Note that in the above computation steps and algorithms provided for calculating properties of particles, the operator "set union $\cup$" is based on particles. That is, two members are considered the same only when they are the same particle. Hereinafter, a detailed description of a method according to an exemplary embodiment of the present invention will be given with reference to FIG. 1. It is noted that the method according to the present invention is a recursive method. Therefore, exact replication and/or illustration in a flowchart is exceedingly difficult. As such, a better recursive representation by way of an example algorithm is provided following the discussion of FIG. 1.

Turning FIG. 1, a method of validating UPA in an XML schema is illustrated. Beginning at block 100, the method 200 includes receiving argument p, a particle. Blocks 101, 102, and 103 comprise a recursive call to the method 200 itself. The recursive call includes recursively calling instances of the method for all particles within the received particle p (see block 101). If the recursive call returns false (see blocks 102 and 103), the originally implemented method returns an overall false value. Because of the recursive nature of the algorithm, each instance called may return either a true or false value, thereby rippling back to the original instance, causing either a true or false value to be returned at block 101.

Blocks 104, 108, 112, and 116 represent decision blocks to handle a plurality of cases. The cases include verifying particles of particular types or sequences do not collide. Block 104 includes checking occurrence information of particles in a schema. For example, if the value n of q{m,n} is greater than one, then q may be used multiple times to match elements in the instance document if this particle is used in schema validation. Therefore, it is necessary to verify that optional particles at the end of q do not collide with particles at the beginning of q (see block 105). If the optional particles did collide, UPA would be violated, and a false should be returned (see blocks 106 and 107).

Block 108 includes verifying particle sequence model group information of a schema. For example, if a sequence of particles is divided into smaller sub-sequences, it is necessary to verify that optional particles at the end of one sub-sequence do not collide with particles at the beginning of a second sub-sequence (see block 109). It is noted that it is necessary to verify sub-sequences instead of only verifying consecutive particles because particles within a sequence may be transparent, thereby making particles before and after the transparent particles collide. If the particles collide, a false should be returned (see blocks 110 and 111). Thus, blocks 108-111 provide validation that optional particles of a latter portion of a first subsequence of the sequence model group information do not collide with particles of a beginning portion of a second subsequence of the sequence model group information.

Block 112 includes verifying particle choice model group information of a schema (i.e., verifying branches). For example, the beginning particles of any two different branches should not collide (see block 113). If the different branches do collide, a false should be returned (see blocks 114 and 115). Thus, blocks 112-115 provide validation that particles of a beginning portion of any two different branches of the XML schema do not collide.

Block 116 includes checking particle all model group information of a schema. Such may be at least partially similar to validation of the choice model group and branches. For example, beginning particles of the all model group should not collide. Furthermore, because the all model group has an implied occurrence information in XML, the optional particles at the end of one branch should not collide with the particles at the beginning of a different branch (see block 117). If the particles do collide, a false should be returned (see blocks 118 and 119). Thus, blocks 116-119 provide validation that particles of beginning portions of all model group members do not collide and provides determining if there is a collision between particles of a beginning portion of a first all model group member and optional particles of a latter portion of a second all model group member.

The method 200 further includes an otherwise clause, or "all else" function, implemented by block 120. Thus, if none of the portions of the method, including recursive calls and verification blocks, return false, the method should return true.

As stated hereinbefore, recursive methods are difficult to accurately translate into visual flowcharts. Therefore, Algorithm 7 (named UPA) is provided below. Algorithm 7 implements the method according to an exemplary embodiment of the present invention. It is formulated with the restriction that two expression sets must be true, expression set 1 and expression set 2. The expression sets are denoted by line numbers 1 and 2 in Algorithm 7 below:

---
Algorithm 7.
---
UPA(p)(
   both of the following must be true:

-continued

Algorithm 7.

1. For all q in particles(p), where q != p, UPA(q);
2. The appropriate case must be true:
   2.1 if p = q{m,n} where n > 1, then
       !collide(first(q),olt(q));
   2.2 if p = (q$_1$,...,q$_n$), then
       $\wedge^n_{i=2}$ !collide(olt((q$_1$,...,q$_{i-1}$)), first((q$_i$,...q$_n$)));
   2.3 if p = (q$_1$|...|q$_n$), then
       !($\vee_{1<=i<j<=n}$ collide(first(q$_i$),first(q$_j$)));
   2.4 if p = (q$_1$&...&q$_n$), then
       !($\vee_{1<=i<j<=n}$ collide(first(q$_i$),first(q$_j$))⋺
       !($\vee_{1<=i!=j<=n}$ collide(first(q$_i$),olt(q$_j$)));
   2.5 otherwise true;
)\\end UPA(p)

As shown in Algorithm 7, each of expression set 1 and 2 must be true for validation of a schema. More particularly, if either of expression sets 1 and 2 are deemed false, then the schema under validation does not comply with unified particle attribution. As further shown in Algorithm 7, expression set 2 is sub-divided into four different verification portions (i.e., see points 2.1, 2.2, 2.3, and 2.4). The methodology depicted at each point 2.1-2.4 may be mapped to steps 104-116 of FIG. 1. However, it is also apparent that the particular order of these steps is not restrictive, therefore, the particular order of the steps depicted in FIG. 1 are not restrictive. For example, any portion of these steps may be implemented in any combination without hindering the functionality of the method illustrated.

Furthermore, it is noted that the method according to the present invention may be implemented on a computer system available for validating XML schema. Therefore, portions or the entirety of the method may be executed as instructions in a processor of the computer system. Thus, the present invention may be implemented, in software, for example, as any suitable computer program. For example, a program in accordance with the present invention may be a computer program product causing a computer to execute the example method described herein: a method for validating unique particle attribution (UPA) constraints in an extensible markup language (XML) schema.

The computer program product may include a computer-readable medium having computer program logic or code portions embodied thereon for enabling a processor of a computer apparatus to perform one or more functions in accordance with one or more of the example methodologies described above. The computer program logic may thus cause the processor to perform one or more of the example methodologies, or one or more functions of a given methodology described herein.

The computer-readable storage medium may be a built-in medium installed inside a computer main body or removable medium arranged so that it can be separated from the computer main body. Examples of the built-in medium include, but are not limited to, rewriteable non-volatile memories, such as RAMs, ROMs, flash memories, and hard disks. Examples of a removable medium may include, but are not limited to, optical storage media such as CD-ROMs and DVDs; magneto-optical storage media such as MOs; magnetism storage media such as floppy disks (trademark), cassette tapes, and removable hard disks; media with a built-in rewriteable non-volatile memory such as memory cards; and media with a built-in ROM, such as ROM cassettes.

Further, such programs, when recorded on computer-readable storage media, may be readily stored and distributed. The storage medium, as it is read by a computer, may enable the method for validating unique particle attribution (UPA) in an extensible markup language (XML) schema, in accordance with an exemplary embodiment of the present invention.

While an exemplary embodiment has been described, it will be understood that those skilled in the art, both now and in the future, may make various improvements and enhancements which fall within the scope of the claims which follow. These claims should be construed to maintain the proper protection for the invention first described.

What is claimed is:

1. A method for validating unique particle attribution (UPA) constraints in an extensible markup language (XML) schema, comprising:
   receiving an input argument including one particle of the XML schema;
   verifying particle occurrence information of the particle through validation that optional particles of an optional latter portion of a repeating term do not collide with particles of a beginning portion of the repeating term;
   verifying particle sequence model group information of the particle through validation that optional particles of a latter portion of a first subsequence of the sequence model group information do not collide with particles of a beginning portion of a second subsequence of the sequence model group information;
   verifying particle choice model group information of the particle through validation that particles of a beginning portion of any two different branches of the XML schema do not collide;
   verifying particle all model group information of the particle through validation that particles of beginning portions of all model group members do not collide and that particles of a beginning portion of a first all model group member do not collide with optional particles of a latter portion of a second all model group member; and
   recursively calling additional instances of the method for validating UPA such that all particles contained in the input argument are subject to verification of UPA constraints, wherein the recursively calling additional instances includes calling, for all particles recursively defined in the particle of the input argument, an instance of the method for validating UPA such that each instance of the method returns a Boolean value indicating whether each particle of all particles recursively defined in the particle of the input argument are valid in terms of unique particle attribution constraints, wherein the Boolean value of each instance of the method is based upon at least seven properties of respective particles, the at least seven properties including,
   a number of particles contained in a particle, wherein the number of particles contained in a particle include any particle recursively defined within the particle,
   opacity of a particle, wherein the opacity of a particle is a Boolean value representative of whether the particle can match an empty string,
   a first set of a particle, wherein the first set of a particle represents all terminals in a particle that match a first symbol in a string matching the particle,
   optional trailing particles of a particle, wherein the optional trailing particles of a particle represent suffixes of the particle that do not need to be matched,
   optional leading terminals of a particle, wherein the optional leading terminals of a particle represent all terminals that lead strings matching members of the optional leading terminals for the particle,
   overlapping of particles, and
   collision of particles.

2. The method of claim 1, wherein verifying the particle occurrence information includes:
  determining if there is a collision between
    any particle of all particles matching a first symbol of a string matching the optional latter portion of a repeating term of the particle, and
    any particle of all terminals leading to strings matching leading terminals of the particle.

3. The method of claim 1, wherein verifying the particle sequence model group information includes:
  determining if there is a collision between
    any particle of all terminals leading to strings matching optional leading terminals of the latter portion of the first subsequence of the sequence model group information, and
    any particle of all particles matching a first symbol of a string matching the particles of the beginning portion of the second subsequence of the sequence model group information.

4. The method of claim 1, wherein the verifying particle choice model group information includes:
  determining if there is a collision between any particle of the beginning portion of any two different branches, wherein the any two different branches include any branch contained in the choice model group information.

5. A non-transitory computer-readable storage medium including computer-executable instructions that, when executed on a host processor of a computer apparatus, direct the host processor to perform a method for validating unique particle attribution (UPA) constraints in an extensible markup language (XML) schema available to the computer apparatus, the method comprising:
  receiving an input argument including one particle of the XML schema;
  verifying particle occurrence information of the particle through validation that optional particles of an optional latter portion of a repeating term do not collide with optional particles of a beginning portion of the repeating term;
  verifying particle sequence model group information of the particle through validation that optional particles of a latter portion of a first subsequence of a sequence model group information do not collide with particles of a beginning portion of a second subsequence of the sequence model group information;
  verifying particle choice model group information of the particle through validation that particles of a beginning portion of any two different branches of the choice model group do not collide;
  verifying particle all model group information of the particle through validation that particles of beginning portions of all model group members do not collide, and that particles of a beginning portion of a first all model group member, and optional particles of a latter portion of a second all model group member do not collide; and
  recursively calling additional instances of the method for validating UPA such that all particles contained in the input argument are subject to verification of UPA, wherein the recursively calling additional instances includes calling, for all particles recursively defined in the particle of the input argument, an instance of the method for validating UPA such that each instance of the method returns a Boolean value indicating whether each particle of all particles recursively defined in the particle of the input argument are valid in terms of unique particle attribution constraints, wherein the Boolean value of each instance of the method is based upon at least seven properties of respective particles, the at least seven properties including,
  a number of particles contained in a particle, wherein the number of particles contained in a particle include any particle recursively defined within the particle,
  opacity of a particle, wherein the opacity of a particle is a Boolean value representative of whether the particle can match an empty string,
  a first set of a particle, wherein the first set of a particle represents all terminals in a particle that match a first symbol in a string matching the particle,
  optional trailing particles of a particle, wherein the optional trailing particles of a particle represent suffixes of the particle that do not need to be matched,
  optional leading terminals of a particle, wherein the optional leading terminals of a particle represent all terminals that lead strings matching members of the optional leading terminals for the particle,
  overlapping of particles, and
  collision of particles.

* * * * *